Figure 1:
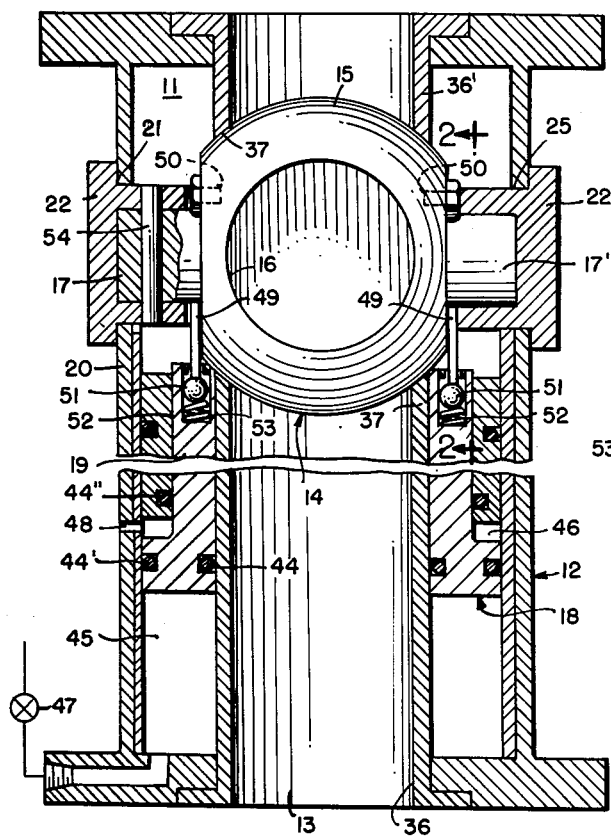

Nov. 13, 1962   C. W. ANDERSON   3,063,671
VALVE STRUCTURE
Filed Dec. 6, 1957

INVENTOR:
CLAYTON W. ANDERSON
BY:
Marzall, Johnston, Cook & Root
ATTORNEYS

United States Patent Office 3,063,671
Patented Nov. 13, 1962

3,063,671
VALVE STRUCTURE
Clayton W. Anderson, 122 E. 9th St., Marion, Ind.
Filed Dec. 6, 1957, Ser. No. 701,099
1 Claim. (Cl. 251—159)

The present invention relates to fluid flow control valves.

An important object of the present invention is to provide a valve structure embodying a housing having a fluid flow channel and a shiftable member for selectively controlling fluid flow in the channel of the housing, and including means for sealing the shiftable member in an adjusted fluid flow controlling position in the housing; a further object being to provide sealing means of the character mentioned in a valve wherein the shiftable member is a turnable or rotary element having a fluid flow duct therein, and hence adapted to permit or prevent fluid flow in the channel of the housing as the turnable member is adjusted in position to connect or to disconnect its duct with the channel of the housing; a still further object being to provide means for sealing a spherical flow controlling valve member.

Another important object of the invention is to provide a valve structure embodying a housing formed with a fluid flow channel and a shiftable member for selectively controlling fluid flow in the channel, including a sleeve-like sealing member mounted in the housing and shiftable axially of the flow channel into and out of sealing engagement with the flow control element; a further object being to provide fluid pressure means for shifting the seal member toward and away from valve sealing position.

Another important object is to drivingly interconnect the sealing member for operation in response to valve opening and closing movement of the shiftable valve element; a further object being to so connect the sealing member that it will be moved to valve sealing position as the shiftable flow control element of the valve reaches valve closed position.

The foregoing and numerous other important objects, advantages, and inherent functions of the invention will become apparent as the same is more fully understood from the following description, which, taken in connection with the accompanying drawings, discloses preferred embodiments of the invention.

Figure 2:
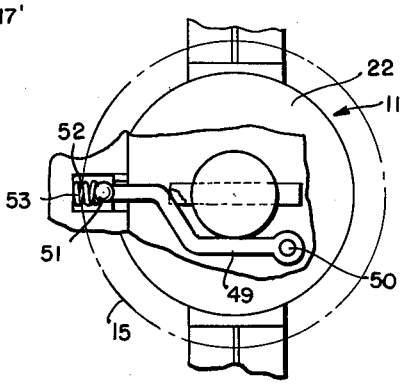

Referring to the drawings:

FIG. 1 is a sectional view through a valve structure embodying the present invention; and FIG. 2 is a sectional view taken substantially along the line 2—2 in FIG. 1.

To illustrate the invention the drawings show a fluid flow control valve 11 embodying a housing structure 12, providing a fluid flow conduit or duct 13, and a shiftable valve element 14 carried in the housing structure in position disposed in said duct. As shown, the valve element may conveniently comprise a spherical plug 15 formed with a diametral channel 16 therethrough, and having oppositely extending and coaxially alined trunnions or shaft stubs 17, 17' formed on opposite sides thereof, the alined axes of the trunnions preferably extending normally of the longitudinal axis of the channel 16. The trunnions 17, 17' may be turnably supported in bearing members carried by the housing structure on opposite sides of the flow duct or conduit 13 to thereby support the valve plug 15 in the duct in position selectively to block the duct or to open the same in communication with the diametral channel of the plug.

Seal means 18 is provided in the housing structure, including a sealing sleeve 19 shiftable longitudinally of the duct or conduit 13 into and out of engagement with the valve plug to releasably seal the same at the junction thereof with the duct 13, said sealing sleeve being shiftably supported on and sealed to portions of the housing structure defining the duct 13 at and adjacent the valve plug.

The housing structure 12 may comprise a generally sleeve-like frame 20 having oppositely opening flanged ends and a medial portion adapted to receive the valve plug 15, said medial portion on one side being formed with a seat 21 for the support of a trunnion bearing 22 in position to receive one of the valve plug trunnions, such as the trunnion 17. The frame 20, on the side thereof opposite from the bearing seat 21, may be formed with a bearing seat 25 for receiving a trunnion bearing 22'.

The duct or conduit 13 may be defined by sleeve-like liners 36, 36', respectively secured in the opposite ends of the frame 20 on opposite sides of the valve plug, said liners having spaced apart, mutually facing ends formed to provide spherical seats 37 adapted to wipingly engage the opposite sides of the spherical plug 15. The sealing sleeve 19 may be mounted for axial movement on one of said liners, such as the liner 36. Accordingly, the sleeve may be moved into position with one end thereof in sealing engagement with the spherical surface of the valve plug concentrically with respect to the seat 37 of said liner, the sealing sleeve 19 having an end formed to sealingly engage with the spherical surface of the valve plug.

Any suitable or preferred means may be employed for moving the sealing sleeve 19 axially of the liner 36. To this end, the sleeve 19 may be formed as a dual area fluid pressure piston having an end slidingly sealed upon the facing surfaces of the frame 20 and liner 36, as by means of pheripheral rings of packing material 44 and 44' mounted in grooves in the sleeve 19 in position to wipingly engage the facing surfaces of the frame and liner. The frame, liner and sleeve member 19 thus form an expansible fluid pressure chamber 45 at the end of the sleeve 19 remote from the valve plug 15. The frame 20 and sleeve 19 may also be slidingly sealed together, as by means of a peripheral packing ring 44" mounted in an inwardly opening groove formed on the frame 20, whereby to provide an expansible fluid chamber 46 on the side of the seal means 44' remote from the chamber 45. By differentially admitting and withdrawing fluid pressure piston actuating media in the chamber 45, as under the control of a manually operable control valve 47, the sleeve 19 may be sealingly engaged with and selectively retracted from the valve plug 15. In that connection, the chamber 46 may be vented outwardly of the frame 20, as through a port 48.

Any suitable driving mechanism may be provided for turning the valve plug 15 in the trunnion bearings 22 and 22'. As shown, means may be provided for actuating the valve element 14 in response to operation of the seal means 18, or vice versa. The structure shown includes means for actuating the valve element 14 in response to operation of the seal means 18. To this end, a pair of valve plug driving links 49 may be rockably connected with the valve plug 15, at the opposite ends thereof, as by means of pivot pins 50 in coaxial alinement and spaced outwardly of the axis of the trunnions 17 and 17'. The ends of the links 49 remote from the pivots 50 may be rockably connected with the sleeve 19, preferably in resiliently yielding fashion. As shown, the pivot remote ends of the links 49 may be formed as balls 51 adapted for rockable reception in mounting sockets 52 formed in the sealing sleeve 19 at the valve plug engaging end thereof, the ball forming ends of the links being resiliently supported in said sockets, as by means of springs 53.

Accordingly, when the sleeve 19 is in retracted position spaced from the valve plug 15, the same may be disposed in the valve structure with the channel 16 in alinement with the duct or conduit 13. As the sleeve 19 is moved toward the valve plug 15, the same will be turned by action of the links 49 toward valve closed position, the plug engaging end of the sleeve 19 being adapted to seal with the plug as the same reaches valve closed position, wherein the axis of the channel 16 is disposed at right angles with respect to the conduit or duct 13. A stop pin 54 mounted in one of the valve plug trunnions, such as the trunnions 17, and having projecting ends fitting in slots formed in the trunnion bearing 22, may be provided to limit opening and closing movement of the valve plug 15.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

A valve comprising a housing forming a chamber, means in said housing forming inlet and outlet ducts communicating with said chamber, including a sleeve-like liner mounted in sad housing and defining a said duct, said sleeve-like liner having an end opening in said chamber and forming a circular seat, a spherical valve element turnable on said seat between open and closed positions to selectively open and close communication between said ducts through said chamber, a sealing sleeve concentrically mounted upon said liner and shiftable thereon into and away from sealing engagement with said spherical valve element, outwardly of said seat, actuating means for shifting the sealing sleeve on the liner toward and away from sealing engagement with the spherical valve element, and a yielding driving connection between the sealing sleeve and said spherical valve element for driving the latter toward and away from one of its said positions, respectively before the sealing sleeve reaches and after it withdraws from sealing engagement with the spherical valve element.

References Cited in the file of this patent

UNITED STATES PATENTS

| | | |
|---|---|---|
| 712,350 | Williamson | Oct. 28, 1902 |
| 783,953 | Henry | Feb. 28, 1905 |
| 1,442,204 | Wilson | Jan. 16, 1923 |
| 1,901,961 | Grant | Mar. 21, 1933 |
| 1,931,797 | Howard | Oct. 24, 1933 |
| 2,203,989 | Hamer | June 11, 1940 |
| 2,437,083 | Dons | Mar. 2, 1948 |
| 2,558,247 | Hamer | June 26, 1951 |
| 2,600,898 | Maxwell | June 17, 1952 |
| 2,654,924 | Wood | Oct. 13, 1953 |
| 2,718,372 | Broz | Sept. 20, 1955 |
| 2,879,798 | Anderson | Mar. 31, 1959 |
| 2,883,146 | Knox | Apr. 21, 1959 |
| 2,883,147 | Mirza | Apr. 21, 1959 |
| 2,934,309 | Morser | Apr. 26, 1960 |

FOREIGN PATENTS

| | | |
|---|---|---|
| 189,162 | Great Britain | Nov. 13, 1922 |
| 626,706 | France | May 16, 1927 |
| 639,043 | France | Mar. 5, 1928 |
| 1,155,199 | France | Nov. 25, 1957 |
| 682,227 | Germany | Oct. 11, 1939 |